United States Patent
Fraser et al.

(10) Patent No.: US 7,729,352 B1
(45) Date of Patent: Jun. 1, 2010

(54) SYSTEM AND METHOD FOR HANDLING FLOWS IN A NETWORK

(75) Inventors: Alexander G. Fraser, Bernardsville, NJ (US); Glenford E. Mapp, Cambridge (GB)

(73) Assignee: AT & T Intellectual Property II, L.P., Reno, NV (US)

( * ) Notice: Subject to any disclaimer, the term of this patent is extended or adjusted under 35 U.S.C. 154(b) by 799 days.

(21) Appl. No.: 11/214,328

(22) Filed: Aug. 29, 2005

Related U.S. Application Data

(63) Continuation of application No. 09/639,935, filed on Aug. 17, 2000, now Pat. No. 6,970,475.

(60) Provisional application No. 60/149,174, filed on Aug. 17, 1999.

(51) Int. Cl.
*H04L 12/28* (2006.01)

(52) U.S. Cl. .......................... 370/392; 370/235

(58) Field of Classification Search .............. 370/389, 370/392, 395, 395.31, 395.32, 428, 429, 370/235, 471, 474
See application file for complete search history.

(56) References Cited

U.S. PATENT DOCUMENTS

| | | | |
|---|---|---|---|
| 5,553,068 A * | 9/1996 | Aso et al. ................ 370/399 |
| 6,078,590 A * | 6/2000 | Farinacci et al. ............ 370/432 |
| 6,115,385 A * | 9/2000 | Vig ............................ 370/401 |
| 6,188,671 B1 * | 2/2001 | Chase et al. ................. 370/232 |
| 6,256,306 B1 * | 7/2001 | Bellenger .................... 370/389 |
| 6,256,314 B1 * | 7/2001 | Rodrig et al. ............... 370/401 |
| 6,701,361 B1 * | 3/2004 | Meier .......................... 709/224 |
| 2003/0123448 A1 * | 7/2003 | Chang ...................... 370/395.1 |

* cited by examiner

*Primary Examiner*—Kwang B Yao
*Assistant Examiner*—Andrew Lai
(74) *Attorney, Agent, or Firm*—Michael K. Dixon; Akerman Senterfitt

(57) ABSTRACT

A flow in a network is identified and handled by using a virtual host address. A packet is received at a switch with a first virtual host address as its destination address. If the packet is the first packet of a flow received by the switch, then a second virtual host address is determined by the switch. The first virtual host address is stored in a packet forwarding table correlated with the second virtual host address. A subsequently received packet of the same flow has the same first virtual host address as its destination address, and is forwarded to the second virtual host address in accordance with the packet forwarding table.

20 Claims, 4 Drawing Sheets

SYSTEM AND METHOD FOR HANDLING FLOWS IN A NETWORK

CLAIM TO PRIORITY

Cross-References to Related Applications

This application is a continuation of U.S. patent application Ser. No. 09/639,935, now U.S. Pat. No. 6,970,475 filed 17 Aug. 2000, by the same inventors and similarly titled.

This application claims the benefit of U.S. Provisional Application No. 60/149,174, filed on Aug. 17, 1999.

FIELD OF THE INVENTION

The field of the invention is handling flows in a network, and in particular handling packets that relate to the same conversation as a part of a flow.

SUMMARY OF THE INVENTION

A flow in a network is identified and handled by using a virtual host address. A packet is received at a switch with a first virtual host address as its destination address. If the packet is the first packet of a flow received by the switch, then a second virtual host address is determined by the switch. The first virtual host address is stored in a packet forwarding table correlated with the second virtual host address. A subsequently received packet of the same flow has the same first virtual host address as its destination address, and is forwarded to the second virtual host address in accordance with the packet forwarding table.

DETAILED DESCRIPTION

The wide area network is evolving to one that integrates virtual circuit switching (label swapping) for flows with conventional datagram forwarding. A first step along that road was described by Ipsilon by Newman, P et al, in *IP Switching-ATM Under IP*, IEEE Trans. on Networking, Vol. 6, No. 2, April 1998, which:
  a) uses a classification algorithm to detect flows among the influx of IP packets;
  b) uses IP datagram forwarding to determine where to send the packet;
  c) creates a virtual circuit connection through the switch to the same place that the IP packet is being sent;
  d) transmits the VCI of that connection to the upstream switch with an indication that subsequent packets should be encapsulated with that VCI; and
  e) arranges that incoming packets encapsulated with that VCI are switched not routed.

Figure 1:
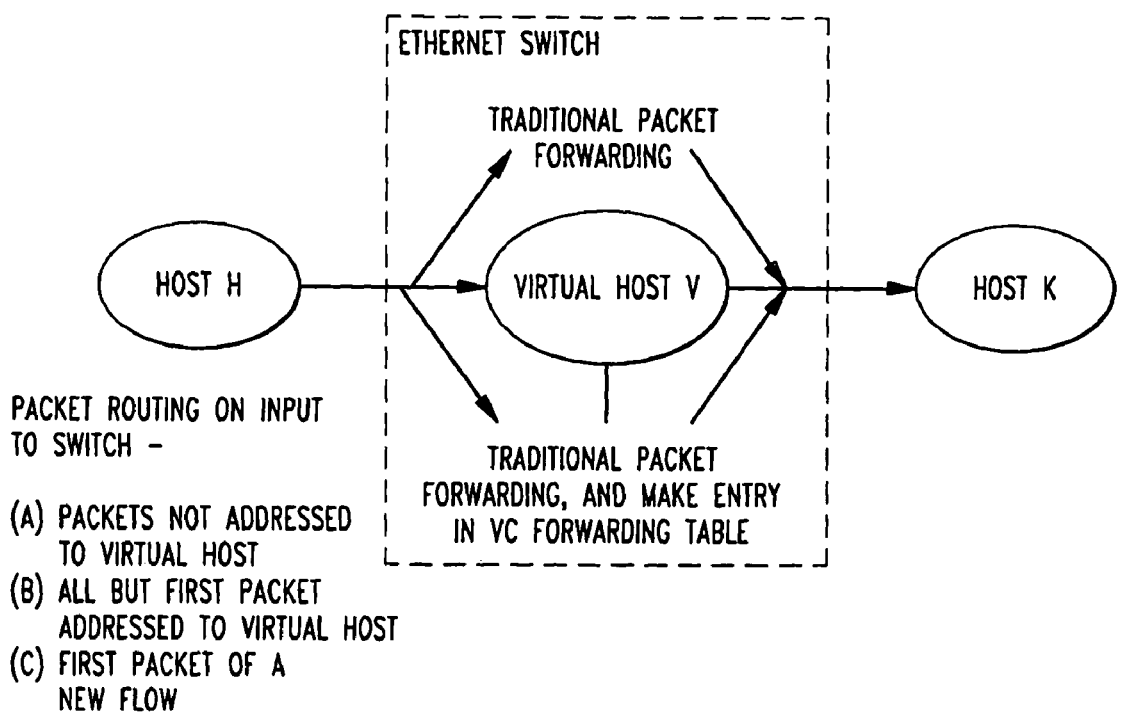
FIG. 1 shows a switch that handles a flow between two hosts in accordance with an embodiment of the present invention.

We have modified this concept to provide flow switching on local area networks (LANs) that use Ethernet. FIG. 1 illustrates a switch that handles a flow between two hosts, H and K. Usually, Ethernet addresses are of hosts rather than endpoints of flows. Our design uses Ethernet addresses to also identify flows on the LAN. It is exactly as if the switch contains one virtual host for every flow. The Ethernet address of that virtual host, referred to here as V, is temporarily assigned from a block of locally administered Ethernet addresses. Packets of a flow from host H to host K pass through the virtual host V. The source and destination addresses in packets leaving H are H and V respectively. Packets traveling from V to K have source and destination addresses equal to V and K. The switch performs Ethernet address swapping as follows:
  a) the destination address of an incoming packet is moved into the source address field; and
  b) a new destination address is obtained from a "VC forwarding table" held within the switch.

The technique is compatible with existing applications of Ethernet because in effect all we have done is to add extra (virtual) hosts to the network.

Whereas the Ipsilon technique used a classification algorithm to detect flows among IP packets, we have experimented with the idea that the host application should make that decision. We have added a single byte, vc_flag, in the general socket structure of our hosts to say that the application wants special service for the flow of packets passing through the socket. The presence of that flag tells the socket software to use a virtual host Ethernet address instead of the destination Ethernet address implied by the IP header.

The switch does traditional Ethernet packet forwarding on all packets except those that are addressed to a virtual host. Packets addressed to a virtual host are switched using data in a VC forwarding table. The first packet for a new flow causes an entry to be made in the VC forwarding table based upon the IP destination contained in the packet.

By this means we have created in the local area a sufficient means to provide quality communication service on a per-flow basis. When the technique is matched to flow switching in a wide area network the user has full benefit of end-to-end flow switching, from a socket in one host to a socket in another. This has been achieved with minimal impact on host software, no interference with existing applications, and complete compatibility with existing Ethernets.

| |
|---|
| DESTINATION ADDRESS |
| SOURCE ADDRESS |
| TYPE |
| PAYLOAD |
| PAD |
| FRAME CHECK |

The Ethernet frame format illustrated above consists of a destination address, source address and protocol type indicator followed by the payload and a frame check. In the following diagrams which describe how Ethernet addresses are manipulated during switching, we are only interested in the destination and source addresses. So Ethernet packets will be represented thus:

| DESTINATION | SOURCE | |
|---|---|---|

Certain Ethernet addresses are used to identify flows. This is done in such a way that network software in the host computers connected to the network work under the impression that the Ethernet, as always, is a device for sending datagrams (individual packets) from one computer to another. An Ethernet switch that supports flows behaves as if it contains within it one virtual host for every flow.

Figure 2:
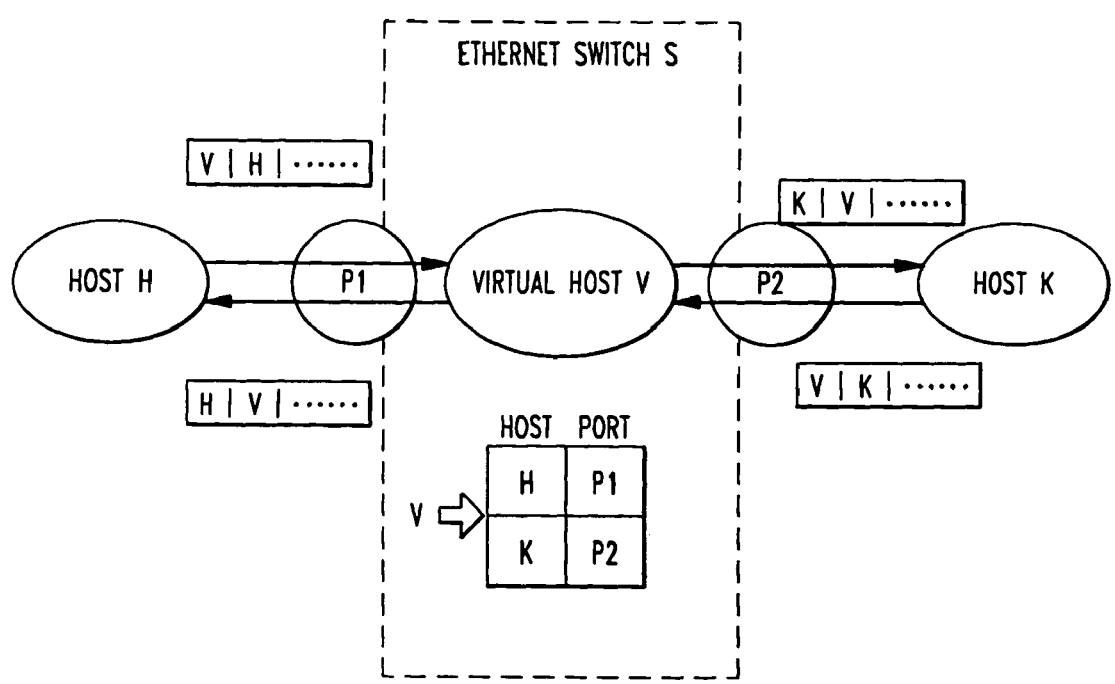
FIG. 2 shows a flow that passes through one Ethernet switch between two hosts in accordance with an embodiment of the present invention.

FIG. 2 illustrates a flow that passes through one Ethernet switch between hosts H and K. The flow is represented in that switch by virtual host V. Host H is connected by an Ethernet to port P1 of switch S, and P2 is connected by Ethernet to host K. Within the switch, incoming packets with destination address V are routed according to the table shown in the lower block. Packets arriving with host address H are rejected if they did not come from port P1. Likewise, packets from K are rejected if they did not come from port P2.

The packet forwarding process first copies the destination address (V) of the incoming packet into the source address of the outgoing packet and then it copies the new destination address from the table. Host K is the destination for packets coming from H, and host H is the destination for packets coming from K.

Figure 3:
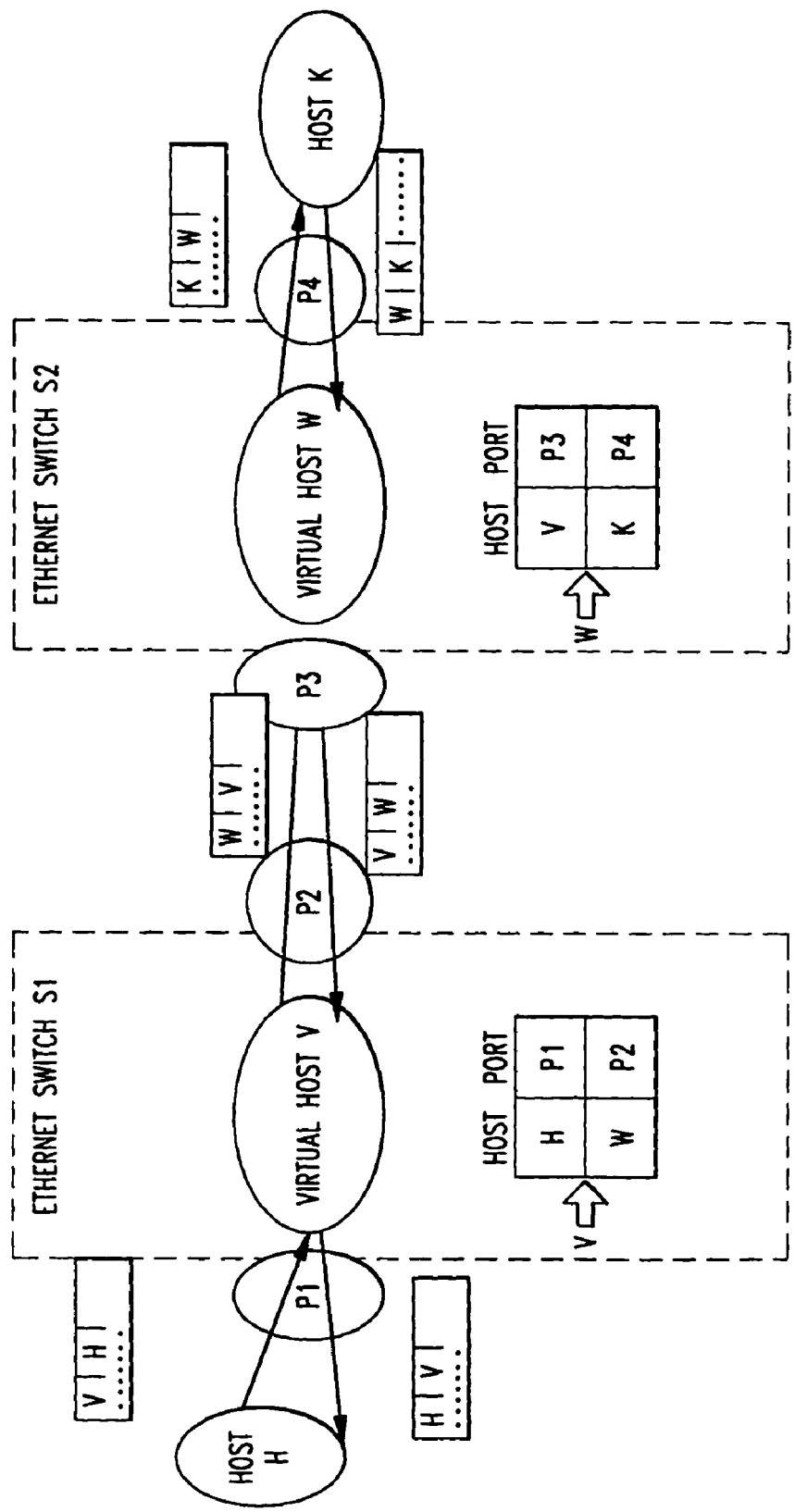
FIG. 3 shows flows between two switches and two hosts in accordance with an embodiment of the present invention.

The same procedure applies when switches are connected in tandem. FIG. 3 illustrates the case when there are two switches between hosts H and K.

As is usual with Ethernet switches, the IP addresses and Ethernet addresses of hosts attached to a particular port are discovered by scanning packet source addresses or by using ARP. The packet forwarding table used by each virtual host is constructed by examining the header of the first IP packet in a flow.

Of course, virtual hosts do not really exist, even as processes within a switch. It is just that the actions of a switch as seen from outside are exactly as described by the model. Internally the switch uses a combination of technologies found today in IP routers and virtual circuit switches. It is a table-driven process that stores packets in queues, processes their headers and transfers them to the appropriate output ports with appropriate attention to the quality of service appropriate to each traffic class.

Figure 4:
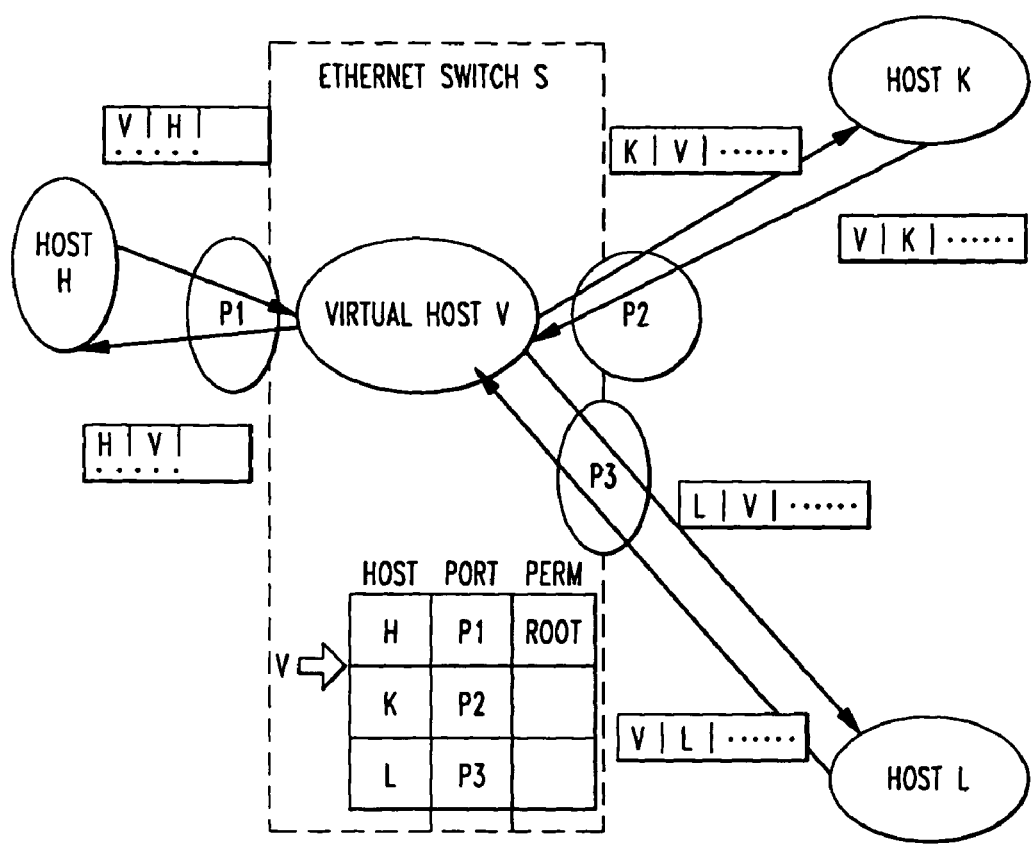
FIG. 4 shows multicast flows in accordance with an embodiment of the present invention.

The same technique can be used for point to multipoint flows, as shown in FIG. 4. In this example, host H is the root of a multicast tree that transmits packets to the two hosts K and L. The forwarding table now has three rows, one for each host in the multicast, and a third column indicates which host is the "root" of the multicast tree. Packets coming from H are copied to each of the hosts given in the other rows of the table. Packets addressed to V from K and L may either be rejected or propagated upstream depending upon the permission stated in the "perm" column. Note that if K and L do transmit packets upstream, H must examine the IP header to determine the source of each packet.

An example of a virtual circuit signaling connection set-up protocol follows. A protocol for setting up a connection between two hosts A and B takes place in three stages. First A requests that the connection be made, then B accepts the request and causes a virtual circuit to be created, and finally A confirms that indeed there is a connection.

The connection request is sent as an ordinary IP datagram from A to B. The accept message is sent as a signal, which is a message from A to B that is flagged for special attention in each of the network nodes along the way. As this signal progresses through the network a (full duplex) virtual circuit is created between A and B. Finally, the confirmation message from A is transmitted over the new virtual circuit.

A socket number is an identifier chosen by a host to represent one end of a connection. Socket numbers for successive conversations should be different one from another so that a long time will elapse between repeated use of any one socket number. This allows any messages involved in a connection set-up to be retransmitted without ambiguity. For IPv4 the socket number is synonymous with port number as used by TCP or UDP. In other words, as is well known in art, a port number is associated with a socket number, and this association of a port number to a socket can change over time. See, for example, W. R. Stevens "Unix Network Programming", Prentice Hall Software Series, April 1990, Chapter 6, "Berkeley Sockets", pages, 258-304.

The connection, accept and confirm message are coincident with the IP packets which normally start a TCP virtual circuit connection on the Internet. A TCP session begins with the following 3-way handshake: Client host A chooses a port number and sends a SYN message to server host B. B chooses a port number, and sends a SYN message to A. A can then use the connection, and sends an ACK message to B. B then understands that it can also use the connection.

Implementation of the TCP virtual circuit as a switched flow at layer 2 takes place concurrently with step two of this handshake. No extra packets need be transmitted.

The embodiments described above advantageously protect the confidentiality, integrity and authenticity of a conversation represented by a flow. As used herein, protecting "confidentiality" means preventing unauthorized access to the contents of the flow. Protecting "integrity" means preventing the unauthorized manipulation or alteration of the flow. Protecting "authenticity" means providing some assurance that the purported source of a packet is the actual source of the packet. As shown in FIG. 2, the VC fowarding table stores a list of allowed hosts (real and virtual) from which packets may come, and to which packets may be sent. Also, switch S stores the port number through which switch S communicates with each host. When a packet from H arrives at switch S through port P, switch S searches the VC forwarding table for a record that correlates the source address of the packet with the port number through which the packet has arrived. If such a record is not found in the VC forwarding table, then the packet is rejected. In other words, if a packet arrives through the wrong port or from an unknown source, then the authenticity and/or integrity of the packet is suspect, and the packet is rejected. This should be implemented for both virtual and real host addresses in all of the switches handling a flow to maximize security.

The above description is meant to illustrate, and not limit, the scope of the present invention. For example, although Ethernet and Internet protocols were discussed in illustrating various embodiments, any suitable protocols can be used in accordance with the present invention. Other embodiments of the present invention will be understood and appreciated by those skilled in the art from the present disclosure.

What is claimed is:

1. A method comprising:
 via a switch communicatively coupled to a telecommunications network:
  receiving a packet comprising a flow identifier, the flow identifier sent to a host responsive to a request for the flow identifier from the host, the packet comprising an Ethernet packet header and an Ethernet payload, the Ethernet packet header comprising an Ethernet source address and an Ethernet destination address, the Ethernet destination address being a first host address that is a virtual host address, the Ethernet payload comprising an Internet Protocol header and an Internet Protocol payload, and the Internet Protocol header comprising an Internet Protocol source address and an Internet Protocol destination address, the packet comprising a single byte virtual circuit flag, the virtual circuit flag adapted to cause socket software to use the virtual host address, the virtual circuit flag adapted to cause socket software to create a full duplex virtual circuit; and storing a second host address correlated with the first host address in a virtual circuit forwarding table, the second host address determined based upon the Internet Protocol destination address in the Internet Protocol header, the second host address being a real host address.

2. The method of claim 1, further comprising:
changing the Ethernet source address of the packet to be equal to the first host address; and
changing the Ethernet destination address of the packet to be equal to the second host address.

3. The method of claim 1, further comprising:
discovering an Internet Protocol (IP) address of the host.

4. The method of claim 1, further comprising:
discovering an Ethernet address of the host.

5. The method of claim 1, further comprising:
determining if the packet entered a switch via a port not associated with the Ethernet source address comprised in the packet.

6. The method of claim 1, further comprising:
rejecting the packet if the packet entered a switch via a port not associated with the Ethernet source address comprised in the packet.

7. The method of claim 1, further comprising:
constructing the virtual circuit forwarding table.

8. The method of claim 1, further comprising:
causing an entry to be made in the virtual circuit forwarding table based upon the Ethernet destination address value.

9. The method of claim 1, further comprising:
storing the packet in a queue.

10. The method of claim 1, further comprising:
transferring the packet to an appropriate output port.

11. The method of claim 1, further comprising:
transferring the packet to an appropriate output port based upon a quality of service associated with the packet.

12. The method of claim 1, wherein the packet is associated with a multicast.

13. The method of claim 1, further comprising:
determining a root node of a multicast tree associated with the packet.

14. The method of claim 1, further comprising:
determining a permission associated with a multicast, the packet associated with a multicast.

15. The method of claim 1, further comprising:
receiving a connection request associated with the packet via an IP datagram.

16. The method of claim 1, further comprising:
accepting a connection request associated with the packet via a flagged signal.

17. The method of claim 1, further comprising:
confirming a connection associated with the packet.

18. The method of claim 1, further comprising:
creating a full duplex virtual circuit associated with the packet.

19. A method comprising:
via a switch communicatively coupled to a telecommunications network:
adding a single byte virtual circuit flag to a packet, the packet comprising a header and a payload, the header comprising a source address and a destination address, the destination address being a virtual host address, the virtual circuit flag adapted to cause socket software to use the virtual host address, the virtual circuit flag adapted to cause socket software to create a full duplex virtual circuit;
setting a value of the virtual circuit flag to indicate when the packet belongs to a flow and requests that the flow be recognized by a network;
determining the virtual circuit flag indicates a flow, replacing the destination address with a real host address, the real host address determined based on the source address and the virtual host address, and replacing the source address with the virtual host address; and
sending the packet to the real host address.

20. A method comprising:
via a switch communicatively coupled to a telecommunications network:
if a received packet comprising a virtual host destination address is a first packet in a flow:
determining a next host destination address;
storing the virtual host destination address and the next host destination address as a correlated pair in a virtual circuit forwarding table; and
forwarding the received packet to the next host destination address specified in the virtual circuit forwarding table for the virtual host destination address, the packet comprising a single byte virtual circuit flag, the virtual circuit flag adapted to cause socket software to use the virtual host destination address, the virtual circuit flag adapted to cause socket software to create a full duplex virtual circuit.

* * * * *